United States Patent
Ando

(10) Patent No.: US 12,157,388 B2
(45) Date of Patent: Dec. 3, 2024

(54) CONTROL DEVICE AND CONTROL METHOD

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 530 days.

(21) Appl. No.: 17/670,790

(22) Filed: Feb. 14, 2022

(65) Prior Publication Data

US 2022/0258640 A1  Aug. 18, 2022

(30) Foreign Application Priority Data

Feb. 17, 2021 (JP) ................................. 2021-023554

(51) Int. Cl.
| | |
|---|---|
| *B60L 53/66* | (2019.01) |
| *G06F 8/65* | (2018.01) |
| *B60L 53/14* | (2019.01) |
| *G06Q 10/0631* | (2023.01) |
| *H02J 7/00* | (2006.01) |

(52) U.S. Cl.
CPC ............... *B60L 53/66* (2019.02); *G06F 8/65* (2013.01); *B60L 53/14* (2019.02); *B60L 2240/547* (2013.01); *G06Q 10/06314* (2013.01); *H02J 7/00034* (2020.01); *Y02T 90/16* (2013.01)

(58) Field of Classification Search
CPC ...................................................... B60L 53/66
USPC ................................................. 320/104, 109
See application file for complete search history.

(56) References Cited

U.S. PATENT DOCUMENTS

2013/0132939 A1    5/2013  Murata et al.

FOREIGN PATENT DOCUMENTS

| | | |
|---|---|---|
| JP | 2011-000894 A | 1/2011 |
| JP | 2017-097620 A | 6/2017 |
| JP | 2018-086894 A | 6/2018 |
| WO | 2011/161778 A1 | 12/2011 |

*Primary Examiner* — Edward Tso
*Assistant Examiner* — Ahmed H Omar
(74) *Attorney, Agent, or Firm* — Dinsmore & Shohl LLP

(57) ABSTRACT

A control device that is mounted on a vehicle including a power storage device, the control device includes a processor. The processor is configured to, when external charging and update of software used in the vehicle are executed in parallel, reduce charging power in the external charging such that a predicted update time needed for the update of the software is less than a predicted charging time needed for the external charging in a case where a time condition is satisfied in which the predicted update time is equal to or longer than the predicted charging time, the external charging being charging of the power storage device using power from an external power source that is provided outside of the vehicle.

4 Claims, 4 Drawing Sheets

CONTROL DEVICE AND CONTROL METHOD

CROSS-REFERENCE TO RELATED APPLICATION

This application claims priority to Japanese Patent Application No. 2021-023554 filed on Feb. 17, 2021, incorporated herein by reference in its entirety.

BACKGROUND

1. Technical Field

The present disclosure relates to a control device and a control method.

2. Description of Related Art

WO 2011/161778 proposes a software update device that is mounted on a vehicle in which a power storage device can be charged from an outside (external charging) and that updates software used in the vehicle, the software update device updating software having an update time shorter than an external charging time.

SUMMARY

An update time of software tends to be long due to an increase in the amount of rewritten data. Due to the long update time of the software, the above-mentioned technique may not be able to perform needed update of the software. In addition, in a case where the update of the software is terminated after the external charging is terminated, the power is consumed by the update of the software after the termination of the external charging, and thus a state of charge of the power storage device may decrease. Further, in a public charging station or the like, in a case where the external charging is restarted after being temporarily terminated, for example, in a case where the update of the software is terminated after the external charging is terminated and the external charging is restarted to compensate for the power consumption caused by the update, re-authentication may be needed. Therefore, there is a need that the update of the software can be terminated (completed) during the external charging in a case where the charging of the power storage device and the update of the software are executed in parallel.

The present disclosure provides a control device and a control method capable of terminating update of software during external charging.

An aspect of the present disclosure relates to a control device that is mounted on a vehicle including a power storage device. The control device includes a processor configured to, when external charging and update of software used in the vehicle are executed in parallel, reduce charging power in the external charging such that a predicted update time needed for the update of the software is less than a predicted charging time needed for the external charging in a case where a time condition is satisfied in which the predicted update time is equal to or longer than the predicted charging time. The external charging being charging of the power storage device using power from an external power source that is provided outside of the vehicle.

In the control device according to the aspect of the present disclosure, when external charging that is charging of the power storage device using power from an external power source and update of software used in the vehicle are executed in parallel, charging power in the external charging is reduced such that a predicted update time needed for the update of the software is less than a predicted charging time needed for the external charging in a case where a time condition is satisfied in which the predicted update time is equal to or longer than the predicted charging time. With this, the update of the software can be terminated (completed) during the external charging. As a result, it is possible to suppress generation of power consumption due to the update of the software after the termination of the external charging, and to suppress a decrease in a state of charge of the power storage device. In particular, in a case where re-authentication (for example, billing authentication) is needed when the external charging is restarted after being temporarily terminated, for example, in a case where re-authentication is needed when the update of the software is terminated (completed) after the external charging is terminated and the external charging is restarted to compensate for the power consumption caused by the update, the above processing can reduce the need to perform re-authentication.

In the aspect, the vehicle may further include a second power storage device having a rated voltage lower than a rated voltage of the power storage device and a converter configured to step down power of a first power line to which the power storage device is connected and to supply the power to a second power line to which the second power storage device is connected. The processor may be configured to, in the case where the time condition is satisfied when the external charging and the update of the software are executed in parallel, set the charging power in the external charging to predetermined power and to raise a target charging level of the second power storage device in a case where the predicted update time is not less than the predicted charging time within a range in which the charging power in the external charging is equal to or greater than the predetermined power. In this way, since the second power storage device is easily charged at the time of external charging, the time for terminating the external charging is likely to be long. With this, the update of the software is likely to be terminated (completed) during the external charging.

In the aspect, the processor may be configured to, when the external charging and the update of the software are executed in parallel, not reduce the charging power in the external charging in a case where the time condition is satisfied when the external charging is automatically restartable after being temporarily terminated. Here, as a case where the external charging can be automatically restarted after being temporarily terminated, for example, there is a case where re-authentication (for example, billing authentication) is not needed when restarting the external charging.

Another aspect of the present disclosure relates to a control method of a vehicle including a power storage device. The control method comprising: executing, by a processor, external charging and update of software used in the vehicle in parallel, the external charging being charging of the power storage device using power from an external power source that is provided outside of the vehicle; and reducing, by the processor, charging power in the external charging such that a predicted update time needed for the update of the software is less than a predicted charging time needed for the external charging when external charging and update of software used in the vehicle are executed in parallel and a time condition is satisfied in which the predicted update time is equal to or longer than the predicted charging time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, an embodiment of the present disclosure will be described with reference examples.

Figure 1:
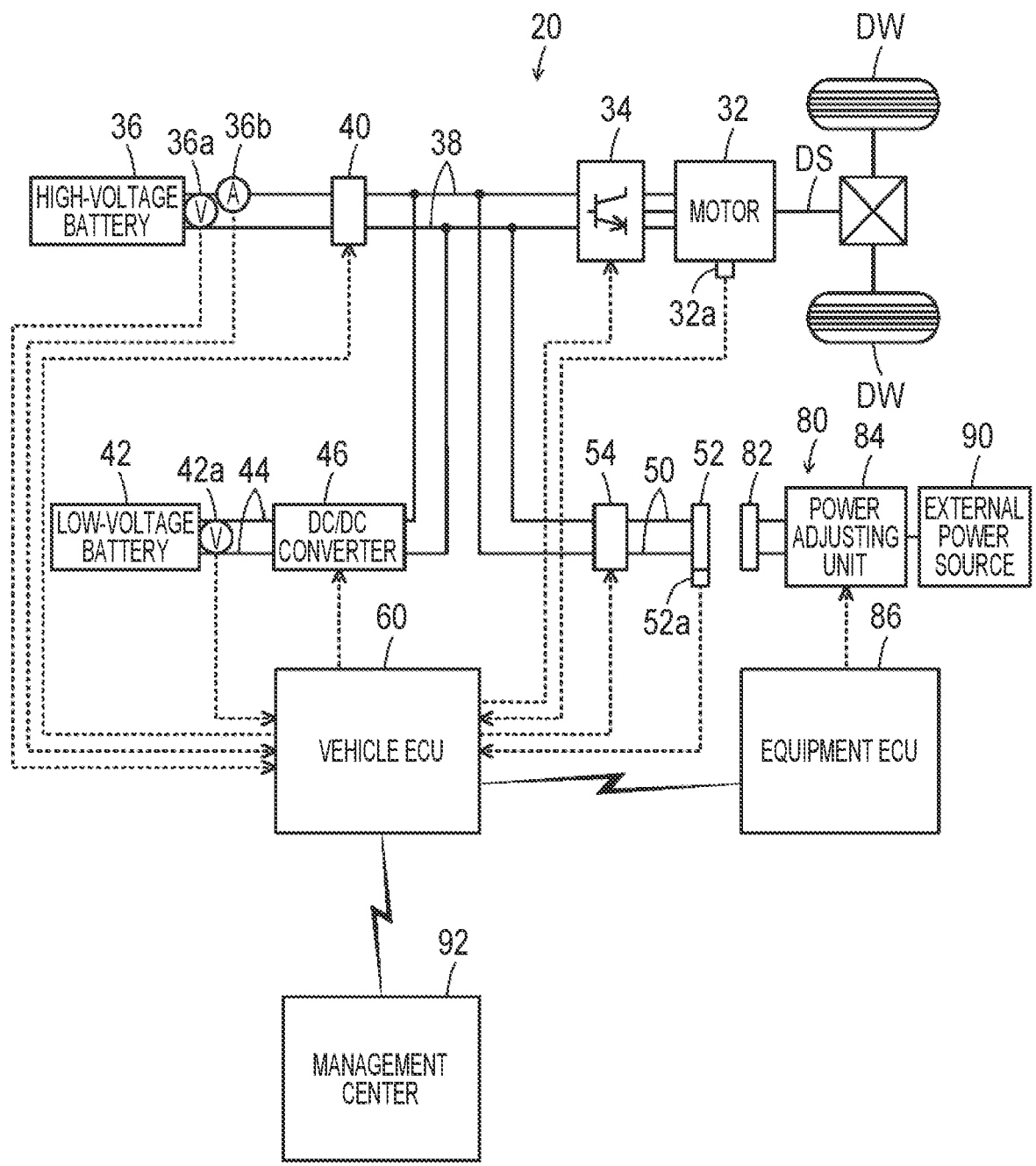
FIG. 1 is a configuration diagram showing an outline of the configuration of charging equipment and an electric vehicle including an control device as an example of the present disclosure.

FIG. 1 is a configuration diagram showing an outline of the configuration of charging equipment 80 and an electric vehicle 20 including an control device as an example of the present disclosure. As shown in FIG. 1, the electric vehicle 20 of the example includes a motor 32 for traveling, an inverter 34, a high-voltage battery 36 as a power storage device, a high-voltage power line (an example of a first power line) 38, a system main relay 40, a low-voltage battery 42 as a second power storage device, a low-voltage power line (an example of a second power line) 44, a DC/DC converter 46, a charging power line 50, a vehicle-side connector 52, a charging relay 54, and a vehicle electronic control unit (hereinafter, referred to as a "vehicle ECU") 60 as a control device.

The motor 32 is configured as, for example, a synchronous generator, and a rotor of the motor 32 is connected to a drive shaft DS connected to drive wheels DW via a differential gear. The inverter 34 is connected to the motor 32 and also connected to the high-voltage power line 38. The motor 32 is rotationally driven by switching control of a plurality of switching elements (not shown) of the inverter 34.

The high-voltage battery 36 is configured as, for example, a lithium ion secondary battery or a nickel-hydrogen secondary battery having a rated voltage of about several tens to several hundreds of V, and is connected to the high-voltage power line 38. The system main relay 40 is provided on the high-voltage power line 38, and connects and disconnects the inverter 34 side and the high-voltage battery 36 side.

The low-voltage battery 42 is configured as, for example, a lithium ion secondary battery, a nickel-hydrogen secondary battery, or a lead-acid battery having a rated voltage of about several tens of V lower than a rated voltage of the high-voltage battery 36, and is connected to the low-voltage power line 44. Various electronic control units, such as the vehicle ECU 60, various lights, audio devices, and the like are also connected to the low-voltage power line 44. The DC/DC converter 46 is connected to the inverter 34 side with respect to the system main relay 40 on the high-voltage power line 38 and is also connected to the low-voltage power line 44, and steps down the power of the high-voltage power line 38 and supplies the power to the low-voltage power line 44.

A first end portion of the charging power line 50 is connected to the inverter 34 side with respect to the system main relay 40 on the high-voltage power line 38, and a second end portion of the charging power line 50 is connected to the vehicle-side connector 52. The vehicle-side connector 52 is configured to be connectable to an equipment-side connector 82 of the charging equipment 80 at home or a charging station. The charging relay 54 is provided on the charging power line 50, and connects and disconnects the vehicle-side connector 52 side and the high-voltage power line 38 side.

Although not shown, the vehicle ECU 60 includes a microprocessor having a CPU, a ROM, a RAM, a flash memory, and input/output ports. Signals from various sensors are input to the vehicle ECU 60 via input ports. Examples of the signal input to the vehicle ECU 60 include a rotational position θ m of the rotor of the motor 32 from a rotational position detection sensor 32a (for example, a resolver) that detects a rotational position of the rotor of the motor 32. A voltage Vbh of the high-voltage battery 36 from a voltage sensor 36a mounted between terminals of the high-voltage battery 36, a current Ibh of the high-voltage battery 36 from a current sensor 36b mounted to an output terminal of the high-voltage battery 36, and a voltage Vbl of the low-voltage battery 42 from a voltage sensor 42a mounted between terminals of the low-voltage battery 42 can also be included. A connection signal from a connection sensor 52a provided on the vehicle-side connector 52 can also be included. Since the vehicle ECU 60 also functions as a vehicle drive control device, information needed for traveling control is also input to the vehicle ECU 60. Examples of the information include an ignition signal from an ignition switch, a shift position from a shift position sensor that detects an operation position of a shift lever, an accelerator operation amount from an accelerator pedal position sensor that detects a depression amount of an accelerator pedal, a brake pedal position from a brake pedal position sensor that detects a depression amount of a brake pedal, and a vehicle speed from a vehicle speed sensor.

Various control signals are output from the vehicle ECU 60 via output ports. Examples of the signal output from the vehicle ECU 60 include a switching control signal to the switching elements of the inverter 34, a control signal to the system main relay 40, a control signal to the DC/DC converter 46, and a control signal to the charging relay 54. The vehicle ECU 60 calculates a state of charge SOCh of the high-voltage battery 36 based on the current Ibh of the high-voltage battery 36 from the current sensor 36b. The vehicle ECU 60 can wirelessly communicate with an equipment electronic control unit (hereinafter, referred to as an "equipment ECU") 86 of the charging equipment 80 at home or a charging station, and can wirelessly communicate with a management center 92. The management center 92 manages various kinds of software used in the vehicle.

The charging equipment 80 includes the equipment-side connector 82, a power adjusting unit 84, and the equipment ECU 86. The equipment-side connector 82 is configured to be connectable to the vehicle-side connector 52 of the electric vehicle 20. The power adjusting unit 84 is connected to an external power source 90 configured as an alternating-current power source, such as a household power source or a commercial power source, and to the equipment-side connector 82, and when the vehicle-side connector 52 and the equipment-side connector 82 are connected to each other and an instruction is given for charging of the high-voltage battery 36, the power adjusting unit 84 converts alternating-current power from the external power source 90 into direct-current power, adjusts the power (voltage or current), and supplies the adjusted power to the electric vehicle 20.

Although not shown, the equipment ECU 86 includes a microprocessor having a CPU, a ROM, a RAM, a flash memory, and input/output ports. Signals from various sensors are input to the equipment ECU 86 via input ports. Various control signals are output from the equipment ECU 86 via output ports. Examples of the signal output from the equipment ECU 86 include a control signal to the power adjusting unit 84. The equipment ECU 86 can communicate with the vehicle ECU 60 of the electric vehicle 20.

In the electric vehicle 20 and the charging equipment 80 according to the example configured in this way, when the vehicle-side connector 52 and the equipment-side connector 82 are connected to each other while the vehicle is stopped in a system-off state, a connection signal is transmitted from the connection sensor 52a to the vehicle ECU 60, and the vehicle ECU 60 detects the connection between the vehicle-side connector 52 and the equipment-side connector 82. Subsequently, when a user gives an instruction to perform external charging that is charging of the high-voltage battery 36 using the power from the external power source 90 (charging equipment 80) with predetermined authentication (for example, billing authentication), the vehicle ECU 60 turns on the system main relay 40 and the charging relay 54, and the equipment ECU 86 controls the power adjusting unit 84 to perform the external charging. At the time of the external charging, the vehicle ECU 60 transmits a power command Pc* for external charging to the equipment ECU 86, and controls the DC/DC converter 46 so that the power of the high-voltage power line 38 is stepped down and supplied to the low-voltage power line 44 when the voltage Vbl of the low-voltage battery 42 is less than a target voltage Vbl*. In addition, at the time, the equipment ECU 86 controls the power adjusting unit 84 so that the power of the power command Pc* is supplied to the electric vehicle 20. Then, when the state of charge SOCh of the high-voltage battery 36 reaches a predetermined state of charge Sch (for example, about 80% to 95%), the vehicle ECU 60 transmits a termination command of the external charging to the equipment ECU 86, and the equipment ECU 86 stops the power adjusting unit 84 upon receiving the command. As a result, the external charging is terminated. Thereafter, the vehicle ECU 60 turns off the system main relay 40 and the charging relay 54.

In the electric vehicle 20 of the example, in order to add, modify, or delete the functions of software used in the vehicle, software update, so-called over-the-air (OTA) reprogramming, may be performed with wireless communication with the management center 92 in a target electronic control unit while the vehicle is stopped in a system-off state.

Figure 2:
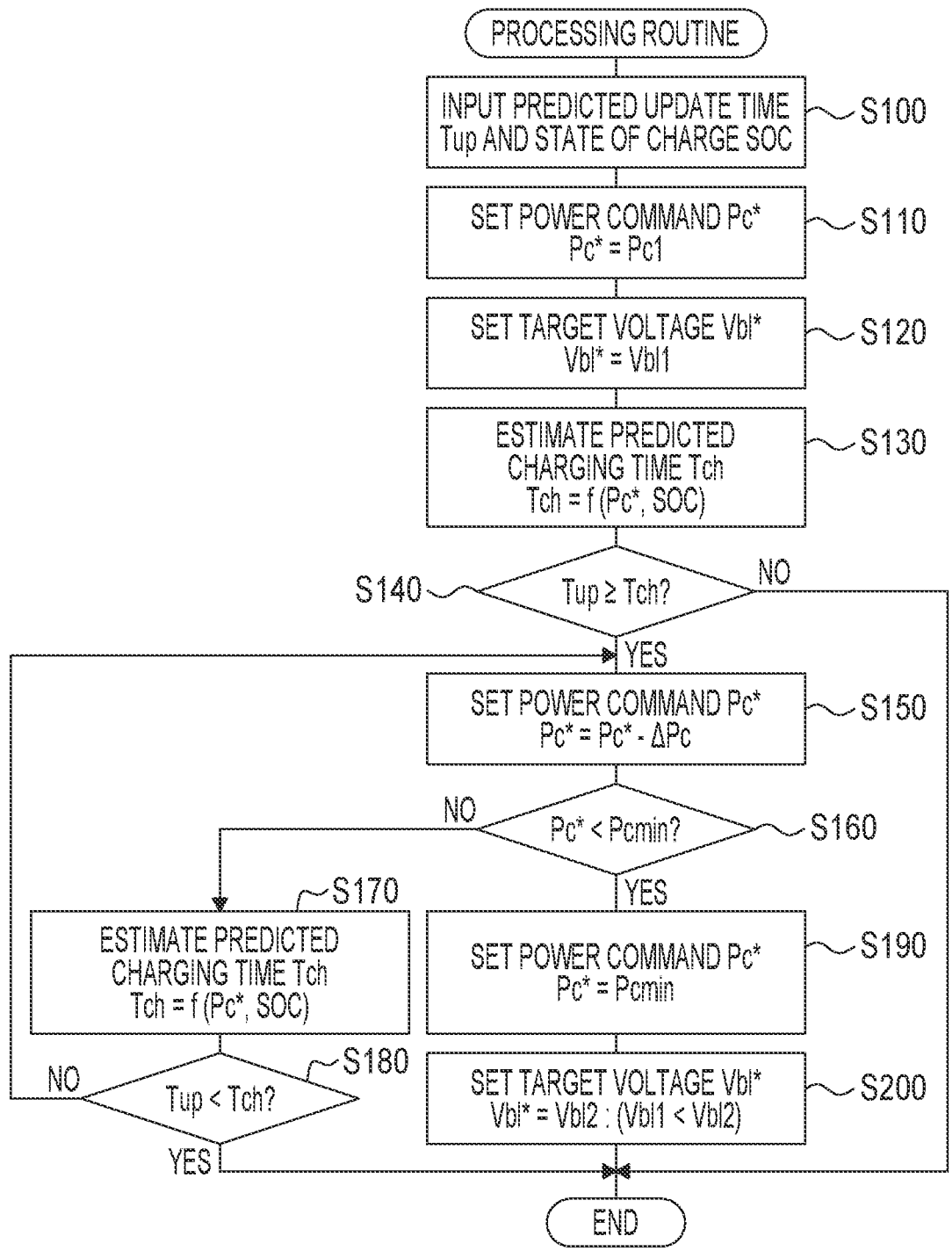
FIG. 2 is a flowchart showing an example of a processing routine executed by a vehicle ECU.

Next, the operation of the vehicle ECU 60 included in the electric vehicle 20 according to the example configured in this way, in particular, processing of setting the power command Pc* for external charging and the target voltage Vbl* of the low-voltage battery 42 when the external charging and the update of software are executed in parallel will be described. FIG. 2 is a flowchart showing an example of a processing routine executed by the vehicle ECU 60. The routine is executed when external charging and update of software are executed in parallel.

When the processing routine of FIG. 2 is executed, the vehicle ECU 60 first inputs data, such as a predicted update time Tup needed for update of software and a state of charge SOCh of the high-voltage battery 36 (Step S100). Here, as the predicted update time Tup of the software, a time received by wireless communication from the management center is input. As the state of charge SOCh of the high-voltage battery 36, a value calculated based on the current Ibh of the high-voltage battery 36 detected by the current sensor 36b is input.

Subsequently, power Pc1 as an initial value is set to the power command Pc* for external charging (Step S110), and a voltage Vbl1 as an initial value is set to the target voltage Vbl* of the low-voltage battery 42 (Step S120). Then, the predicted charging time Tch needed for external charging is estimated based on the power command Pc* for external charging and the state of charge SOCh of the high-voltage battery 36 (Step S130). Here, the predicted charging time Tch can be estimated, for example, as a value obtained by dividing a power amount based on a difference (Sch−SOCh) between the predetermined state of charge Sch and the state of charge SOCh of the high-voltage battery 36 by the power command Pc* for external charging or as a value obtained by applying needed correction thereto.

When the predicted charging time Tch of the external charging is estimated in this way, the predicted update time Tup and the predicted charging time Tch are compared with each other (Step S140). This processing is processing of determining whether or not the update of software can be terminated during the external charging by performing the external charging with the power command Pc* in which the power Pc1 is set. When the predicted update time Tup is less than the predicted charging time Tch, determination is made that the update of software can be terminated during the external charging by performing the external charging with the power command Pc* in which the power Pc1 is set, and the present routine ends. When the present routine ends, the power command Pc* is transmitted to the equipment ECU 86, and the target voltage Vbl* is used to determine whether or not the low-voltage battery 42 needs to be charged (whether or not to drive the DC/DC converter 46).

When the predicted update time Tup is equal to or longer than the predicted charging time Tch in Step S140, determination is made that the update of software cannot be terminated during the external charging by performing the external charging with the power command Pc* in which the power Pc1 is set, and a value obtained by subtracting predetermined power ΔPc from the power command Pc* is reset as a new power command Pc* (Step S150). Here, the predetermined power ΔPc is appropriately set.

Subsequently, the reset power command Pc* is compared with minimum power Pcmin with which the external charging can be performed (Step S160). Here, the minimum power Pcmin is set based on specifications of the electric vehicle 20 and the like. When the power command Pc* is equal to or greater than the minimum power Pcmin, the predicted charging time Tch is estimated based on the power command Pc* and the state of charge SOCh of the high-voltage battery 36, and the predicted update time Tup and the predicted charging time Tch are compared with each other, as in the processes of Steps S130 and S140 (Steps S170 and S180). Here, the processing of Step S180 is processing of determining whether or not the update of software can be terminated (completed) during the external charging by performing the external charging with the power command Pc* reset in Step S150. When the predicted update time Tup is equal to or longer the predicted charging time Tch, determination is made that the update of software cannot be terminated (completed) during the external charging by performing the external charging with the power command Pc* reset in Step S150, and the process returns to Step S150.

When the predicted update time Tup is less than the predicted charging time Tch in Step S180, determination is made that the update of software can be terminated (completed) during the external charging by performing the external charging with the power command Pc* reset in Step S150, and the present routine ends. In the example, when the external charging is performed with the power command Pc* in which the power Pc1 is set, in a case where the predicted update time Tup is equal to or longer than the predicted charging time Tch (in a case where the update of software cannot be terminated during the external charging), the power command Pc* is reduced so that the predicted update time Tup is less than the predicted charging time Tch, whereby the update of software can be terminated during the external charging. Therefore, it is possible to suppress generation of power consumption due to the update of software after the termination of the external charging. Furthermore, it is possible to suppress generation of a phenomenon in which after the termination of the external charging, the voltage Vbl of the low-voltage battery 42 is lowered by the power consumption due to the update of software, and power is supplied from the high-voltage battery 36 to the low-voltage battery 42 via the DC/DC converter 46, whereby the state of charge SOCh of the high-voltage battery 36 decreases. As a result, it is possible to suppress a reduction in a possible traveling distance in the next trip. In particular, in a case where re-authentication (for example, billing authentication) is needed when the external charging is restarted after being temporarily terminated, for example, in a case where re-authentication is needed when the update of the software is terminated after the external charging is terminated and the external charging is restarted to compensate for the power consumption caused by the update, the need to perform re-authentication can be reduced by performing the processing of the example.

When the power command Pc* is less than the minimum power Pcmin in Step S160, the minimum power Pcmin is set to the power command Pc* (Step S190), and a voltage Vbl2 higher than the voltage Vbl1 is set to the target voltage Vbl* of the low-voltage battery 42 (Step S200), and the present routine ends. By increasing the target voltage Vbl* of the low-voltage battery 42, the low-voltage battery 42 is easily charged by using at least a part of the power from the external power source 90 (charging equipment 80) at the time of external charging, so that the time for terminating the external charging is likely to be long. With this, the update of the software is likely to be terminated during the external charging.

In the vehicle ECU 60 as the control device included in the electric vehicle 20 according to the above-described example, when the external charging and the update of software are executed in parallel, in a case where a time condition is satisfied in which the predicted update time Tup is equal to or longer than the predicted charging time Tch when the external charging is performed with the power command Pc* in which the power Pc1 is set, the power command Pc* is reduced so that the predicted update time Tup is less than the predicted charging time Tch. With this, the update of the software can be terminated (completed) during the external charging.

In the vehicle ECU 60 included in the electric vehicle 20 according to the example, when the external charging and the update of software are executed in parallel, in a case where the predicted update time Tup is not equal to or longer than the predicted charging time Tch within a range in which the power command Pc* is equal to or greater than the minimum power Pcmin, the minimum power Pcmin is set to the power command Pc*, and the voltage Vbl2 higher than the voltage Vbl1 is set to the target voltage Vbl* of the low-voltage battery 42. However, in this case, although the minimum power Pcmin is set to the power command Pc*, the voltage Vbl1 may be set to the target voltage Vbl* of the low-voltage battery 42.

Figure 3:
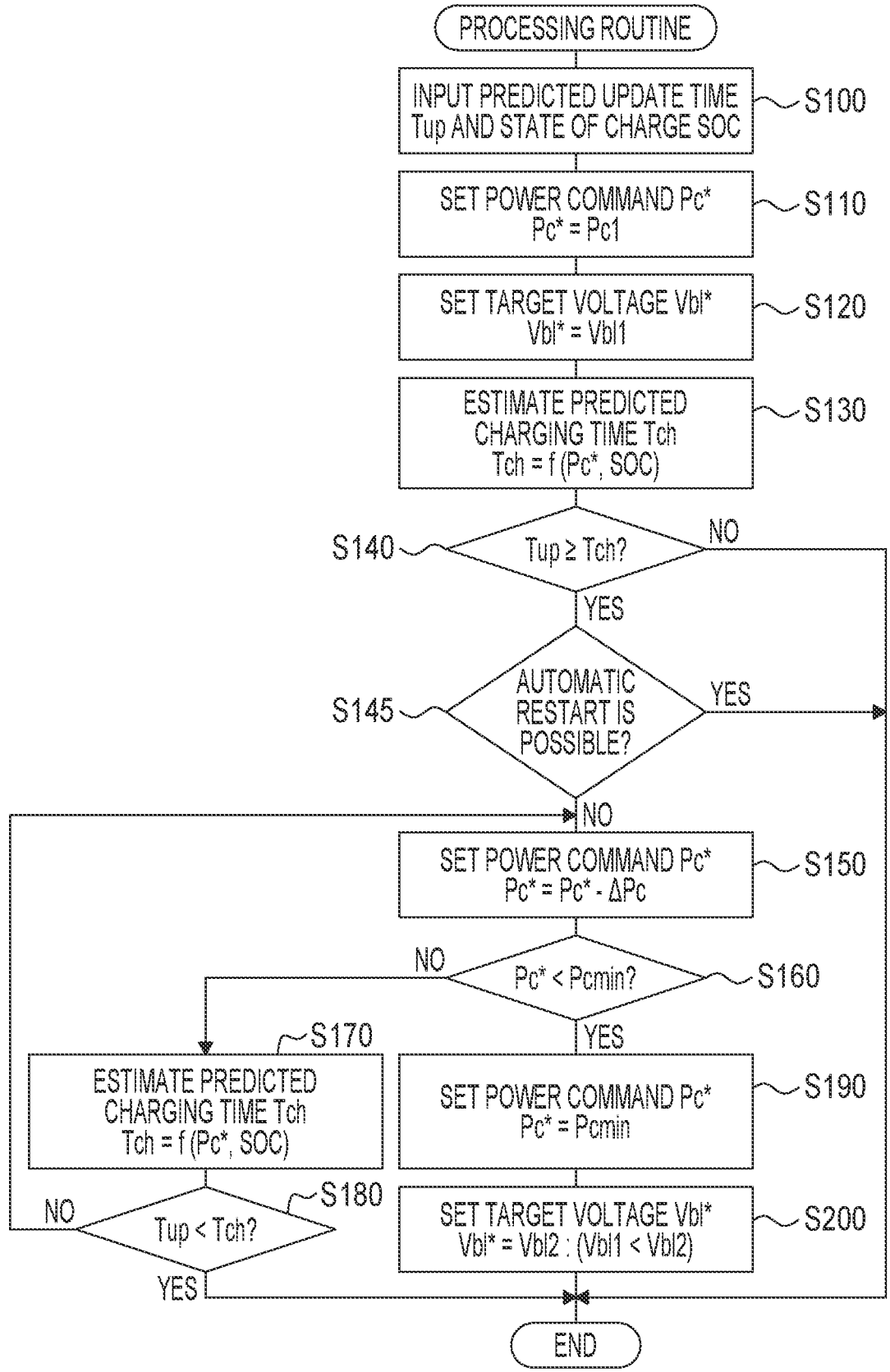
FIG. 3 is a flowchart showing an example of a processing routine executed by the vehicle ECU.

In the vehicle ECU 60 included in the electric vehicle 20 according to the example, the processing routine of FIG. 2 is executed. However, instead of the processing routine of FIG. 2, a processing routine of FIG. 3 may be executed. The processing routine of FIG. 3 is different from the processing routine of FIG. 2 in that processing of Step S145 is added. Therefore, in the processing routine of FIG. 3, the same processing as the processing routine of FIG. 2 is denoted by the same step number, and detailed description thereof will be omitted.

In the processing routine of FIG. 3, when the predicted update time Tup is longer than the predicted charging time Tch in Step S140, the vehicle ECU 60 determines whether or not the external charging can be automatically restarted after being temporarily terminated (Step S145). Here, as a case where the external charging can be automatically restarted after being temporarily terminated, for example, there is a case where re-authentication (for example, billing authentication) is not needed when restarting the external charging.

When determination is made in Step S145 that the external charging cannot be automatically restarted after being temporarily terminated, the processing on and after Step S150 is executed. The reason is as follows. At this time, when the update of the software is terminated after the external charging is terminated and the external charging is restarted to compensate for power consumption (decrease in the state of charge SOCh of the high-voltage battery 36) caused by the update, re-authentication (for example, billing authentication) is needed, and thus, a user feels troublesome or additional cost is incurred. Considering this fact, it is desired to reduce the power command Pc* so that the predicted update time Tup is less than the predicted charging time Tch, as in the example. Therefore, the processing on and after Step S150 is executed.

When determination is made in Step S145 that the external charging can be automatically restarted after being temporarily terminated, the present routine ends without executing the processing on and after Step S150. The reason is as follows. At this time, when the update of the software is terminated after the external charging is terminated and the external charging is restarted to compensate for power consumption (decrease in the state of charge SOCh of the high-voltage battery 36) caused by the update, the external charging can be restarted without the need for re-authentication. Therefore, since there is no need to reduce the power command Pc* so that the predicted update time Tup is less than the predicted charging time Tch, the present routine ends without executing the processing on and after Step S150.

In the processing routine of FIG. 3, the vehicle ECU 60 executes processing of determining whether or not the external charging can be automatically restarted after being temporarily terminated (Step S145) when the predicted update time Tup is longer than the predicted charging time Tch in Step S140. However, the processing of Step S145 may be executed between the processing of Step S120 and the processing of Step S130.

Figure 4:
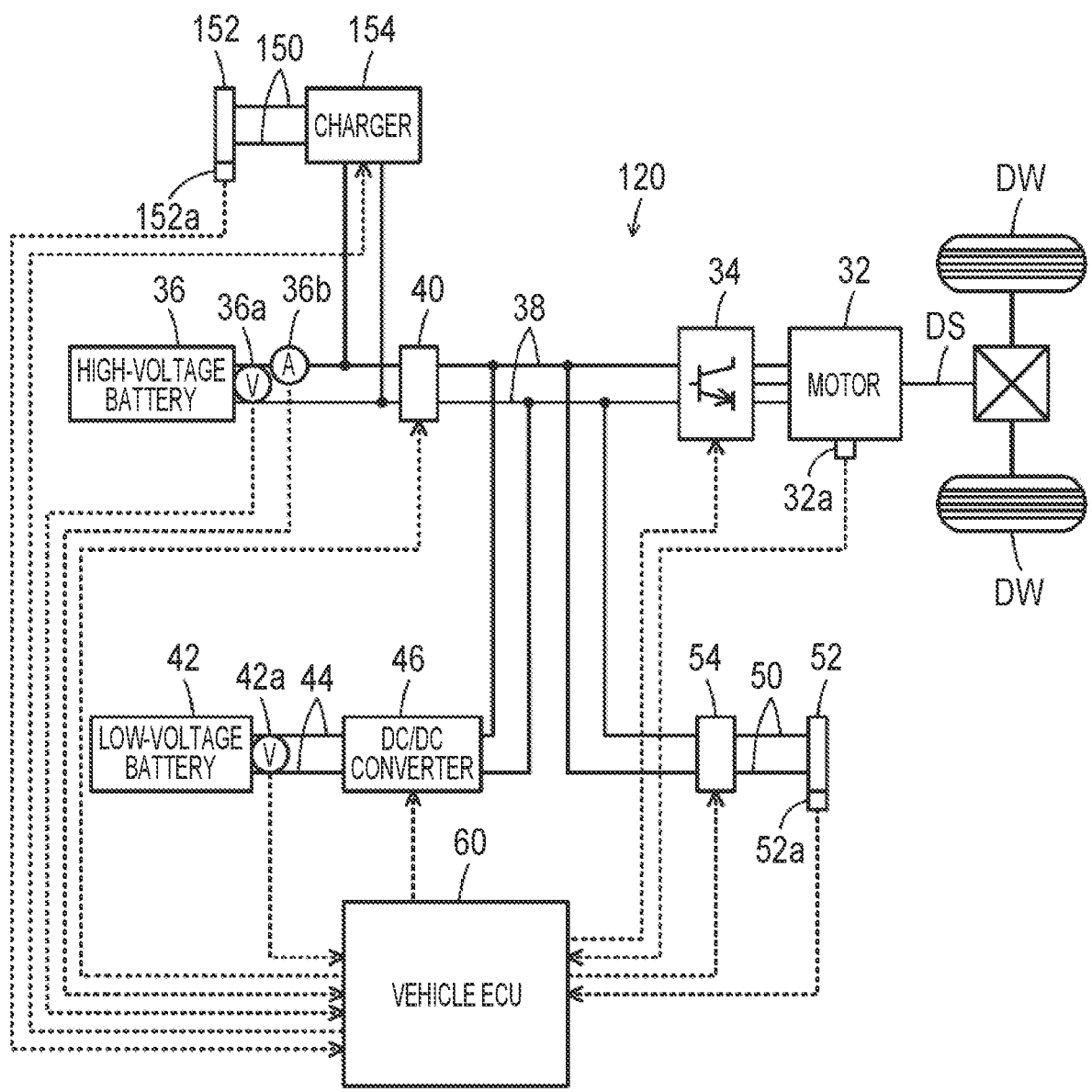
FIG. 4 is a configuration diagram showing an example of an electric vehicle of a modification example.

The electric vehicle 20 according to the example includes the charging power line 50, the vehicle-side connector 52, and the charging relay 54 that are used for charging by direct-current power (DC charging). However, as shown in an electric vehicle 120 according to a modification example of FIG. 4, in addition to the same hardware configuration as the electric vehicle 20, a charging power line 150, a vehicle-side connector 152, and a charger 154 that are used for charging by alternating-current power (AC charging) may be included.

A first end portion of the charging power line 150 is connected to the high-voltage battery 36 side with respect to the system main relay 40 on the high-voltage power line 38, and a second end portion of the charging power line 150 is connected to the vehicle-side connector 152. The vehicle-side connector 152 is configured to be connectable to a power source-side connector connected to an alternating-current external power source (a power source similar to the external power source 90) at home or a charging station. The charger 154 is provided on the charging power line 150, and is configured to convert alternating-current power from an external power source into direct-current power and to adjust a voltage (power) so that the voltage (power) can be supplied to the high-voltage battery 36 side.

The vehicle ECU 60 of the electric vehicle 120 receives a signal similar to the signal of the vehicle ECU 60 of the electric vehicle 20, and also receives a connection signal from the connection sensor 152a provided on the vehicle-side connector 152. The vehicle ECU 60 of the electric vehicle 120 outputs a signal similar to the signal of the vehicle ECU 60 of the electric vehicle 20, and also outputs a control signal to the charger 154.

In the electric vehicle 120 according to the modification example configured in this way, when the vehicle-side connector 52 and the equipment-side connector 82 are connected to each other and a user gives an instruction for external charging (DC charging) while the vehicle is stopped in a system-off state, DC charging is performed. In addition, when the vehicle-side connector 152 and the power source-side connector connected to the alternating-current external power source (a power source similar to the external power source 90) are connected to each other and a user gives an instruction for external charging (AC charging) while the vehicle is stopped in a system-off state, AC charging is performed. When DC charging is performed, the power command Pc* set in the processing routine of FIG. 2 or FIG. 3 is transmitted to the equipment ECU 86, and when AC charging is performed, the power command Pc* set in the processing routine of FIG. 2 or FIG. 3 is used to control the charger 154. With this, the same effect as described above can be obtained both in a case where DC charging is performed and in a case where AC charging is performed.

The electric vehicle 120 according to the modification example includes the charging power line 50, the vehicle-side connector 52, and the charging relay 54 that are used for DC charging, and the charging power line 150, the vehicle-side connector 152, and the charger 154 that are used for AC charging. However, the electric vehicle 120 may include the charging power line 150, the vehicle-side connector 152, and the charger 154 that are used for AC charging without including the charging power line 50, the vehicle-side connector 52, and the charging relay 54 that are used for DC charging.

In the electric vehicle 20 according to the example, the high-voltage battery 36 is used as the power storage device. However, a capacitor may be used as the power storage device.

In the example, the vehicle ECU 60 is mounted on the electric vehicle 20 including the motor 32, the high-voltage battery 36, the low-voltage battery 42, and the DC/DC converter 46. However, the vehicle ECU may be mounted on a vehicle other than the electric vehicle 20, for example, a hybrid vehicle including an engine in addition to the same configuration as the electric vehicle 20, or a fuel cell vehicle including a fuel cell in addition to the same configuration as the electric vehicle 20.

The correspondence between the main elements of the example and the main elements of the disclosure described in the "Summary" section will be described. In the example, the high-voltage battery 36 is an example of the "power storage device", the electric vehicle 20 is an example of the "vehicle", and the vehicle ECU 60 is an example of the "control device". In addition, the low-voltage battery 42 is an example of the "second power storage device", and the DC/DC converter 46 is an example of the "converter".

Note that the correspondence between the main elements of the example and the main elements of the disclosure described in the "Summary" section does not limit the elements of the disclosure described in the "Summary" section since the example is an example for specifically describing the mode for carrying out the disclosure described in the "Summary" section. That is, the interpretation of the disclosure described in the "Summary" section should be made based on the description in the section, and the example is merely a specific example of the disclosure described in the "Summary" section.

Although the mode for carrying out the present disclosure has been described above by way of the example, the present disclosure is not limited to the example in any way, and it is needless to say that the present disclosure may be carried out in various modes without departing from the scope of the present disclosure.

The present disclosure is applicable to a manufacturing industry of an in-vehicle control device.

What is claimed is:

1. A control device that is mounted on a vehicle including a power storage device, the control device comprising
a processor configured to, when external charging and update of software used in the vehicle are executed in parallel, reduce charging power in the external charging such that a predicted update time needed for the update of the software is less than a predicted charging time needed for the external charging in a case where a time condition is satisfied in which the predicted update time is equal to or longer than the predicted charging time, the external charging being charging of the power storage device using power from an external power source that is provided outside of the vehicle.

2. The control device according to claim 1, wherein:
the vehicle further includes a second power storage device having a rated voltage lower than a rated voltage of the power storage device and a converter configured to step down power of a first power line to which the power storage device is connected and to supply the power to a second power line to which the second power storage device is connected; and
the processor is configured to, in the case where the time condition is satisfied when the external charging and the update of the software are executed in parallel, set the charging power in the external charging to predetermined power and to raise a target charging level of the second power storage device in a case where the predicted update time is not less than the predicted charging time within a range in which the charging power in the external charging is equal to or greater than the predetermined power.

3. The control device according to claim 1, wherein the processor is configured to, when the external charging and the update of the software are executed in parallel, not reduce the charging power in the external charging in a case where the time condition is satisfied when the external charging is automatically restartable after being temporarily terminated.

4. A control method of a vehicle including a power storage device, the control method comprising:

executing, by a processor, external charging and update of software used in the vehicle in parallel, the external charging being charging of the power storage device using power from an external power source that is provided outside of the vehicle; and reducing, by the processor, charging power in the external charging such that a predicted update time needed for the update of the software is less than a predicted charging time needed for the external charging when external charging and update of software used in the vehicle are executed in parallel and a time condition is satisfied in which the predicted update time is equal to or longer than the predicted charging time.

* * * * *